(12) United States Patent
Tien

(10) Patent No.: US 9,743,730 B2
(45) Date of Patent: Aug. 29, 2017

(54) PROTECTIVE COVER AND HOLDER FOR ELECTRONIC DEVICE

(71) Applicant: HON HAI PRECISION INDUSTRY CO., LTD., New Taipei (TW)

(72) Inventor: Li-Wen Tien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 147 days.

(21) Appl. No.: 14/729,724

(22) Filed: Jun. 3, 2015

(65) Prior Publication Data

US 2016/0088911 A1    Mar. 31, 2016

(30) Foreign Application Priority Data

Sep. 29, 2014    (CN) .......................... 2014 1 0511051

(51) Int. Cl.

| | |
|---|---|
| *B65D 25/24* | (2006.01) |
| *B65D 5/52* | (2006.01) |
| *A45C 11/00* | (2006.01) |
| *F16M 13/00* | (2006.01) |
| *H04B 1/3888* | (2015.01) |
| *F16M 11/38* | (2006.01) |
| *H04M 1/04* | (2006.01) |
| *H04M 1/18* | (2006.01) |

(52) U.S. Cl.
CPC ............. *A45C 11/00* (2013.01); *F16M 11/38* (2013.01); *F16M 13/00* (2013.01); *H04B 1/3888* (2013.01); *H04M 1/04* (2013.01); *A45C 2011/002* (2013.01); *A45C 2200/15* (2013.01); *H04M 1/185* (2013.01)

(58) Field of Classification Search
CPC .. B65D 5/5206; B65D 2207/00; B65D 25/24; B65D 5/52; H04B 1/3888; A45C 11/00; A45C 2011/002; A45C 2200/15; F16M 11/38; F16M 13/00; H04M 1/04; H04M 1/185
USPC ........ 206/320, 45.2, 45.24, 45.26, 751, 747, 206/774, 45.28, 45.23; 220/4.21, 4.23, 220/4.22; 455/575.8; 40/723, 755
See application file for complete search history.

(56) References Cited

U.S. PATENT DOCUMENTS

| | | | |
|---|---|---|---|
| 8,439,191 B1 * | 5/2013 | Lu .................. | H04B 1/3888 206/320 |
| 8,618,415 B2 * | 12/2013 | Wennemer ........... | B29C 43/02 150/154 |
| 2010/0300909 A1 * | 12/2010 | Hung ................... | H04M 1/04 206/320 |
| 2014/0202899 A1 * | 7/2014 | Murchison .......... | H05K 5/0013 206/320 |

* cited by examiner

*Primary Examiner* — J. Gregory Pickett
*Assistant Examiner* — Rafael Ortiz
(74) *Attorney, Agent, or Firm* — Steven Reiss

(57) ABSTRACT

A protective cover includes a first shell and a second shell cooperating to receive an electronic device. The protective cover further includes a rigid frame mounted on the second shell. The first and second shells are flexible, and the rigid frame is made of rigid material. The second shell equipped with the rigid frame hinges on the first shell to form a holder to support the electronic device at a viewing angle. The protective cover includes soft shell for absorbing physical shocks and a rigid frame for structural support at a viewing angle on a supporting surface when the electronic device is in use.

8 Claims, 4 Drawing Sheets

PROTECTIVE COVER AND HOLDER FOR ELECTRONIC DEVICE

CROSS-REFERENCE TO RELATED APPLICATIONS

This application claims priority to Chinese Patent Application No. 201410511051.0 filed on Sep. 29, 2014, the contents of which are incorporated by reference herein.

FIELD

The subject matter herein generally relates to a protective cover and a holder for receiving an electronic device therein, and supporting the electronic device at a viewing angle.

BACKGROUND

A protective cover is usually used for protecting an electronic device. Some protective covers can also be used for supporting the electronic device at an angle while in use. Existing protective covers are usually formed as a single rigid shell or a single soft shell.

BRIEF DESCRIPTION OF THE DRAWINGS

Implementations of the present disclosure will now be described, by way of example only, with reference to the attached figures.

DETAILED DESCRIPTION

Figure 1:
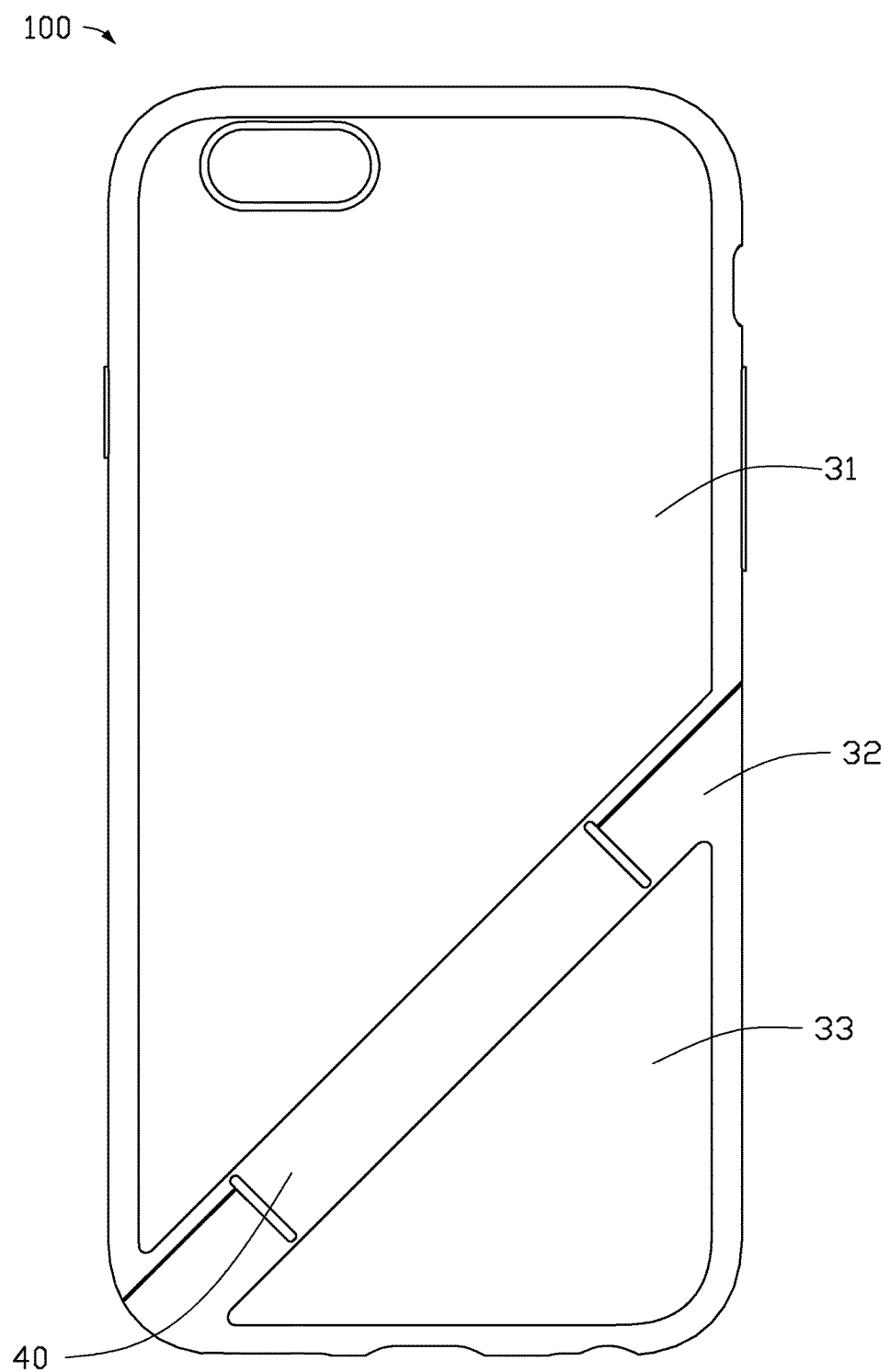
FIG. 1 is a diagrammatic view of a protective cover.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts can be exaggerated to better illustrate details and features.

The present disclosure, including the accompanying drawings, is illustrated by way of examples and not by way of limitation. A definition that applies throughout this disclosure will now be presented. It should be noted that references to "an" or "one" embodiment in this disclosure are not necessarily to the same embodiment, and such references mean "at least one."

Furthermore, the term "comprising" means "including, but not necessarily limited to"; it specifically indicates open-ended inclusion or membership in a so-described combination, group, series and the like.

Figure 2:
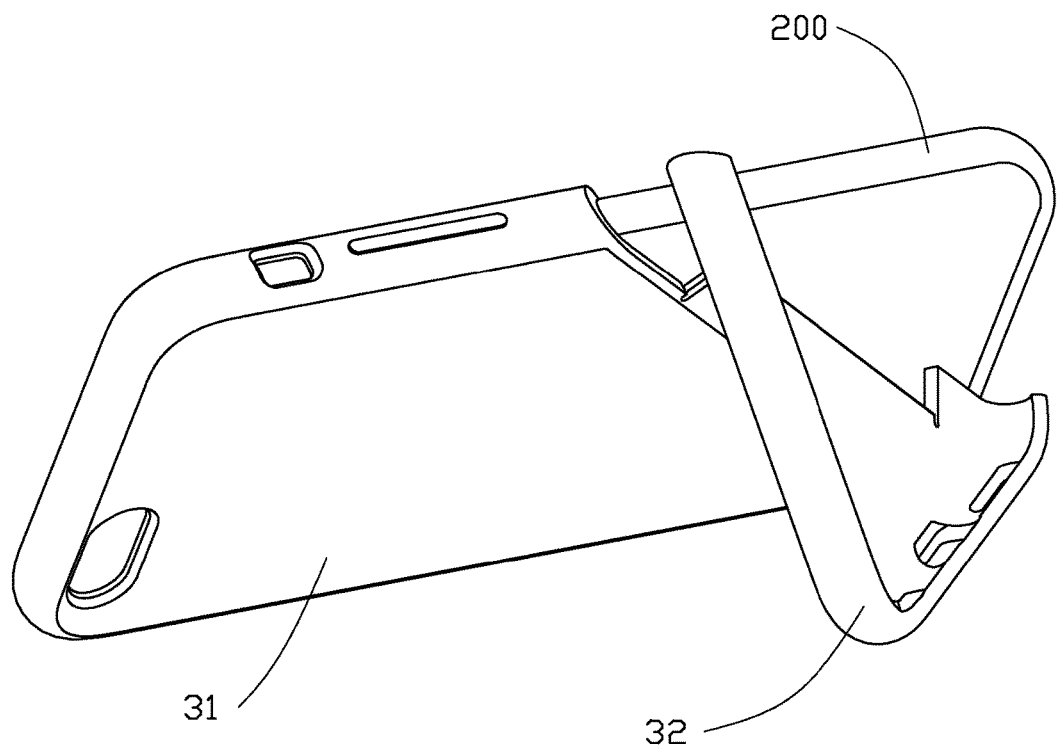
FIG. 2 is an isometric view of the protective cover of FIG. 1 receiving an electronic device.

FIG. 1 is a diagrammatic view of a protective cover. In the embodiment as shown in FIG. 1, a protective cover 100 is configured for receiving an electronic device 200 (as shown in FIG. 2). In the embodiment, the protective cover 100 includes a first shell 31 and a second shell 32 which cooperate to receive the electronic device 200. In the embodiment, the protective cover 100 further includes a rigid frame 33 which is mounted on the second shell 32.

FIG. 2 shows that the protective cover 100 also acts as a holder for supporting the electronic device 200 at a viewing angle. In the embodiment, the second shell 32 equipped with the rigid frame 33 can be rotatable relative to the first shell 31, to form an angle between the first shell 31 and the second shell 32, whereby the protective cover 100 forms a holder to support the electronic device 200 at a viewing angle on a supporting surface (not shown), preferably at an angle of 45 degrees.

In the embodiment, the first shell 31 configured to hold and protect the electronic device 200 on at least three sides, and the second shell 32 is rotatably connected along a diagonal hinge 40 to the first shell 31 to define at least first and second orientations relative to the first shell 31. In the embodiment, the first orientation is parallel with the first shell 31, and the second shell 32 is configured to hold and protect the electronic device 200 on at least two sides. The second orientation is rotated about the diagonal hinge 40, and the second shell 32 acts as a back stand which is configured to, via a combination with the first shell 31, support the electronic device 200 at a viewing angle when the holder is on a supporting surface. In the embodiment, when the holder is on the supporting surface, a side of the first shell 31 and a corner of the second shell 32 provide the contact with the supporting surface to support the holder.

In the embodiment, the first shell 31 and the second shell 32 are made of flexible material, such as thermoplastic polyurethane material, so as to provide a cushion to protect the electronic device 200 against physical shocks.

In the embodiment, the rigid frame 33 is made of rigid material, such as polycarbonate material, to provide sufficient structural strength for the protective cover 100 to support the electronic device 200 when the electronic device 200 is in use.

Figure 3:
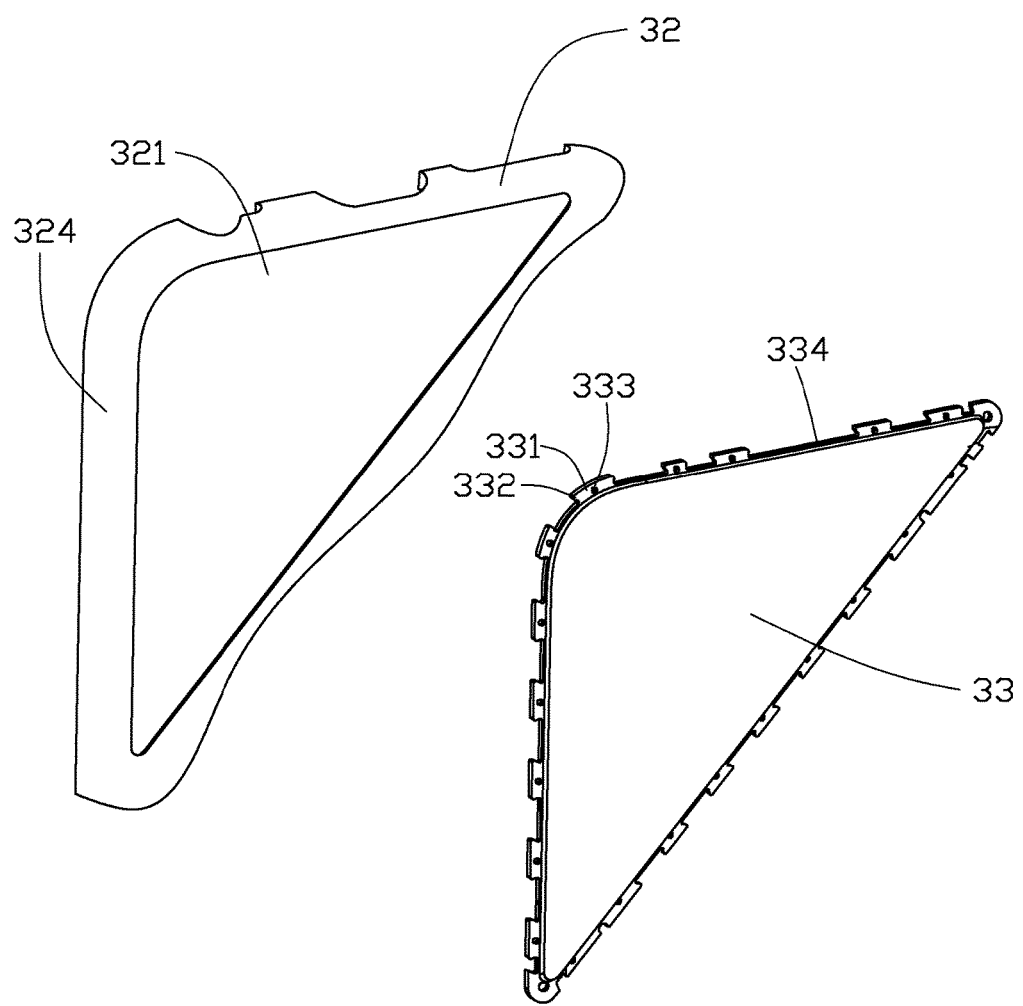
FIG. 3 is an exploded, partial view of the protective cover of FIG. 1.

FIG. 3 shows that the second shell 32 defines a concavity 321 on an external surface 324 thereof for receiving the rigid frame 33.

Figure 4:
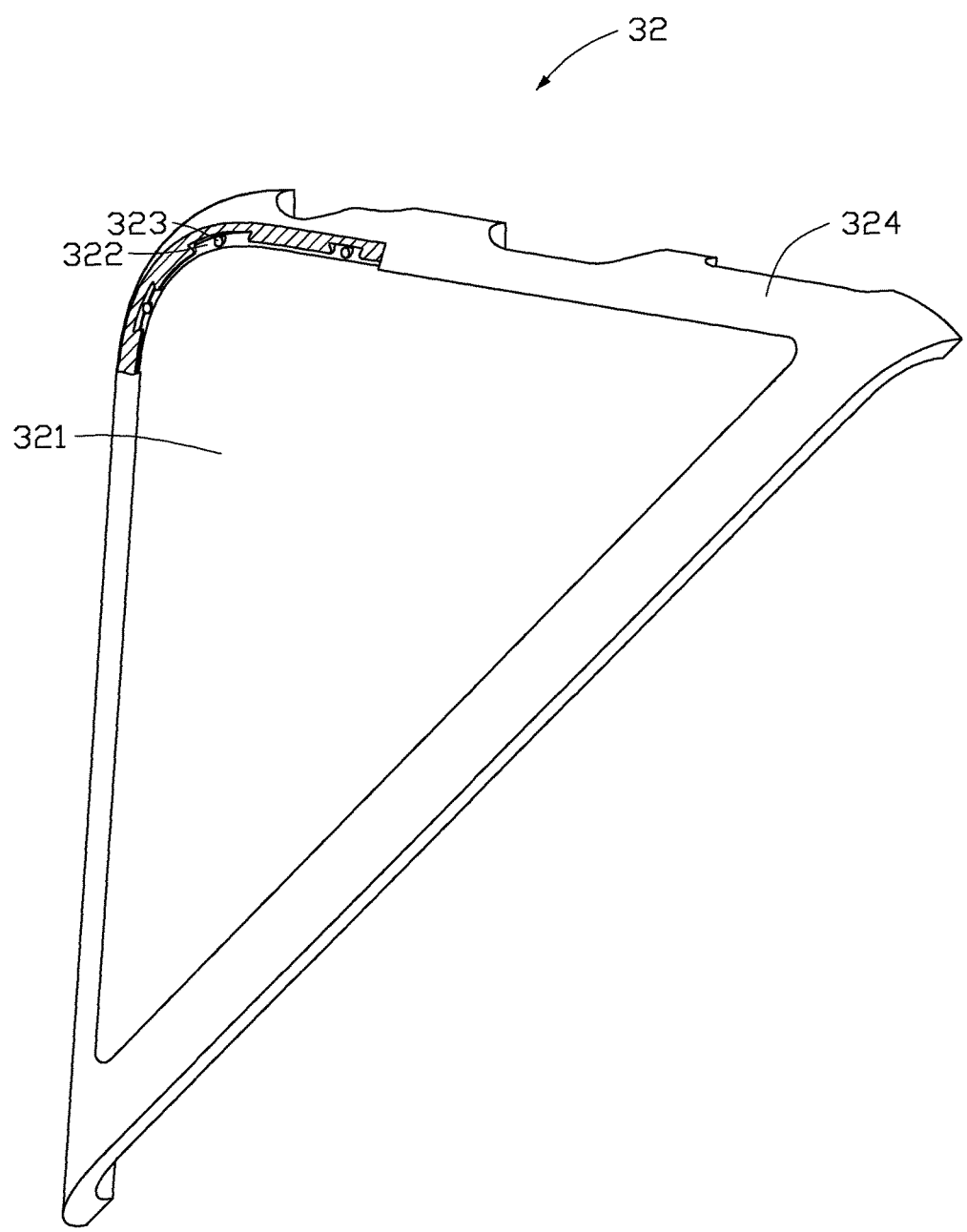
FIG. 4 is a partial cross-sectional view of the protective cover of FIG. 1.

In the embodiment, the rigid frame 33 includes a number of edges 334 and a number of convex portions 331 extending from the edges 334 of the rigid frame 33. FIG. 4 shows that the second shell 32 further defines a number of recessed portions 322 on the side wall of the concavity 321 for receiving the number of convex portions 331 of the rigid frame 33.

In the embodiment, each convex portion 331 includes a pair of hooks 332 extending from two sides of a free end portion of the convex portions 331 towards adjacent convex portions 331. In the embodiment, each hook 332 is configured to abut against the interior of the recessed portion 322 when the convex portions 331 are received in the recessed portions 322, to prevent the rigid frame 33 separating from the second shell 32.

In the embodiment, the second shell 32 further includes at least one protrusion 323 extending from the interior of the recessed portion 322, and the convex portion 331 defines at least one hole 333 for insertion of the protrusion 323, in order to mount the rigid frame 33 firmly in the concavity 321 of the second shell 32.

With such structure, the protective cover 100 includes soft shell for absorbing physical shocks when, for example, the electronic device 200 falls to the floor, and a rigid frame for providing sufficient structural support for the protective cover 100 to support the electronic device 200 when the electronic device 200 is in use.

At least part of the outer boundaries of shells 31 and 32 may be made of rubber or other high friction material so as to grip the supporting surface on which the protective cover 100 is placed in FIG. 2. This high friction material will grip the supporting surface so that the first shell 31 and the second shell 32 do not slide apart from each other.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in particular the matters of shape, size, and arrangement of parts within the principles of the present disclosure, up to and including the full extent established by the broad general meaning of the terms used in the claims.

What is claimed is:

1. A protective cover comprising:
    a first shell and a second shell cooperating to receive an electronic device, wherein the first shell and the second shell are made of flexible material, the second shell defines a concavity on an external surface thereof; and
    a rigid frame mounted on the concavity of the second shell, wherein the rigid frame is made of rigid material, the rigid frame comprises a plurality of edges and a plurality of convex portions extending flat from the edges of the rigid frame, and the second shell further defines a plurality of recessed portions on the side wall of the concavity for receiving the plurality of convex portions of the rigid frame, each convex portion comprises a pair of hooks extending from two sides of a free end portion of the convex portions towards adjacent convex portions, and each hook is configured to abut against the interior of the recessed portion when the convex portions are received in the recessed portions, the second shell further comprises at least one protrusion extending from the interior of the recessed portion, and the convex portion defines at least one hole for insertion of the protrusion, in order to mount the rigid frame firmly in the concavity of the second shell;
    wherein the second shell equipped with the rigid frame is rotatable relative to the first shell to form an angle between the first shell and the second shell, whereby the protective cover forms a holder to support the electronic device at a viewing angle on a supporting surface.

2. The protective cover as described in claim 1, wherein the first shell and the second shell are made of thermoplastic polyurethane material.

3. The protective cover as described in claim 1, wherein at least part of the outer boundaries of the first shell and the second shell are made of high friction material so as to grip the supporting surface on which the protective cover is placed.

4. The protective cover as described in claim 1, wherein the rigid frame is made of polycarbonate material.

5. A holder for an electronic device, comprising:
    a first shell configured to hold and protect the electronic device on at least three sides; and
    a second shell rotatably connected along a diagonal hinge to the first shell to define at least first and second orientations relative to the first shell, comprising:
        the first orientation being parallel with the first shell, wherein the second shell is configured to hold and protect the electronic device on at least two sides; and
        the second orientation being rotated about the hinge, wherein the second shell acts as a back stand which is configured to, via a combination with the first shell, support the electronic device at a viewing angle when the holder is on a supporting surface;
    wherein when the holder is on the supporting surface, a side of the first shell and a corner of the second shell provide the contact with the supporting surface to support the holder;
    wherein the holder further comprises a rigid frame mounted on the second shell, the rigid frame is made of rigid material, the rigid frame comprises a plurality of edges and a plurality of convex portions extending from the edges of the rigid frame; the second shell further defines a concavity on an external surface thereof for receiving the rigid frame, a plurality of recessed portions are defined on the side wall of the concavity for receiving the plurality of convex portions of the rigid frame, wherein each convex portion comprises a pair of hooks extending from two sides of a free end portion of the convex portions towards adjacent convex portions, and wherein each hook is configured to abut against the interior of the recessed portion when the convex portions are received in the recessed portions, the second shell further comprises at least one protrusion extending flat from the interior of the recessed portion, and the convex portion defines at least one hole for insertion of the protrusion, in order to mount the rigid frame firmly in the concavity of the second shell.

6. The holder as described in claim 5, wherein the first shell and the second shell are made of flexible material, and at least part of the outer boundaries of the first shell and the second shell are made of high friction material so as to grip the supporting surface on which the protective cover is placed.

7. The holder as described in claim 6, wherein the first shell and the second shell are made of thermoplastic polyurethane material.

8. The holder as described in claim 5, wherein the rigid frame is made of polycarbonate material.

* * * * *